(12) United States Patent
Skiles

(10) Patent No.: US 6,980,836 B1
(45) Date of Patent: Dec. 27, 2005

(54) ACCESSORY FOR SUPPORTING A CELLULAR TELEPHONE IN A MOTOR VEHICLE

(76) Inventor: John M. Skiles, 7129 Greenview Dr., Battleground, IN (US) 47920

( * ) Notice: Subject to any disclaimer, the term of this patent is extended or adjusted under 35 U.S.C. 154(b) by 399 days.

(21) Appl. No.: 10/603,276

(22) Filed: Jun. 26, 2003

(51) Int. Cl.[7] ............................. H04B 1/38; H04M 1/00
(52) U.S. Cl. ............................... 455/569.2; 455/575.9; 455/345; 379/428.02; 379/441
(58) Field of Search .......................... 455/550.1, 569.1, 455/569.2, 575.1, 575.2, 575.9, 556.1, 557, 455/344, 345, 346, 347, 90.3; 379/428.01, 379/428.02, 430, 433.01, 434, 441, 446, 379/447, 449, 450

(56) References Cited

U.S. PATENT DOCUMENTS

| 5,414,770 | A | * | 5/1995 | Wang ........................ 379/446 |
| 5,568,537 | A | | 10/1996 | Shechet |
| 5,613,222 | A | | 3/1997 | Guenther |
| 5,724,667 | A | * | 3/1998 | Furuno ..................... 455/575.2 |
| 5,839,919 | A | * | 11/1998 | Chen ........................ 455/575.9 |
| 5,850,613 | A | | 12/1998 | Bullecks |
| 5,860,824 | A | * | 1/1999 | Fan ............................. 439/265 |
| 5,881,149 | A | | 3/1999 | Weatherill |
| 5,988,577 | A | | 11/1999 | Phillips et al. |
| 6,108,566 | A | | 8/2000 | Albanese et al. |
| 6,138,041 | A | * | 10/2000 | Yahia ....................... 455/569.2 |
| 6,154,663 | A | | 11/2000 | Itamouchi |
| 6,272,362 | B1 | | 8/2001 | Wang |
| 6,304,764 | B1 | * | 10/2001 | Pan ........................... 455/569.2 |
| 6,374,126 | B1 | * | 4/2002 | MacDonald et al. ...... 455/569.1 |
| 6,712,304 | B1 | * | 3/2004 | Taylor ....................... 455/575.2 |

* cited by examiner

*Primary Examiner*—Quochien B. Vuong
(74) *Attorney, Agent, or Firm*—Donald R. Schoonover

(57) ABSTRACT

An accessory that can be mounted on a receptacle for a cigarette lighter in a motor vehicle includes a unit that can support a cellular telephone. The unit is adjustable and can accommodate a variety of different cellular telephones. A headset unit supporting hook is mounted on the unit so a headset can be stored with the cellular telephone when not in use.

4 Claims, 2 Drawing Sheets

ACCESSORY FOR SUPPORTING A CELLULAR TELEPHONE IN A MOTOR VEHICLE

BACKGROUND OF THE INVENTION

1. Field of the Invention

The present invention relates to the general art of cellular telephones, and to the particular field of accessories for cellular telephones.

2. Discussion of the Related Art

In recent times, use of a cellular telephone has become more and more popular. People use cellular telephones in many situations, including while they are driving a motor vehicle. Many States have laws that require a driver to have his or her hands free to control the motor vehicle while using a cellular telephone.

Therefore, there is a need for an accessory for permitting a driver to maintain his or her hands free during use of a cellular telephone.

The art contains several examples of accessories for permitting hands-free operation of a cellular telephone in a motor vehicle. However, the presently-available accessories are not convenient to mount and may not place the cellular telephone in the most accessible location. Still further, many of the presently available accessories are not easily adapted to accommodate a variety of cellular telephones.

Therefore, there is a need for an accessory for permitting a driver to maintain his or her hands free during use of a cellular telephone and which can be mounted in a motor vehicle in a location that is convenient and easily accessible to a driver.

Still further, there is a need for such an accessory that can be easily altered to accommodate a variety of different cellular telephones.

Still further, some cellular telephones have the capability to be used with a headset. However, presently available accessories cannot accommodate a headset when the cellular telephone and/or the headset is not in use. This disadvantage may require a user to store the headset in one location and the cellular telephone in another location. Then, the user must find and retrieve each item before using the headset with the telephone. Not only is this inconvenient, it can be dangerous if the person is looking for one or the other item while he or she is driving.

Therefore, there is a need for an accessory for permitting a driver to maintain his or her hands free during use of cellular telephone which can accommodate a headset in a convenient and easily accessible location when either the cellular telephone or the headset is not in use.

PRINCIPAL OBJECTS OF THE INVENTION

It is a main object of the present invention to provide an accessory for permitting a driver to maintain his or her hands free during use of a cellular telephone.

It is another object of the present invention to provide an accessory for permitting a driver to maintain his or her hands free during use of cellular telephone and which can be mounted in a motor vehicle in a location that is convenient and easily accessible to a driver.

It is another object of the present invention to provide an accessory that can be easily altered to accommodate a variety of different cellular telephones.

It is another object of the present invention to provide an accessory for permitting a driver to maintain his or her hands free during use of cellular telephone which can accommodate a headset in a convenient and easily accessible location when either the cellular telephone or the headset is not in use.

SUMMARY OF THE INVENTION

These, and other, objects are achieved by an accessory for a cellular telephone which comprises a base unit which is adapted to be mounted in a cigarette lighter receptacle of a motor vehicle; an arm pivotally connected to said base unit; a cellular telephone-supporting unit fixedly attached to the arm and which includes a ledge, a first side element movably mounted on the cellular telephone-supporting unit, a second side element movably mounted on the cellular telephone-supporting unit, a headset-supporting hook on the second side element, and a side element-moving mechanism in the cellular telephone-supporting unit, the side element-moving mechanism including a width adjustment knob on the cellular telephone-supporting unit, the width-adjusting knob being connected to the first and second side elements; and a headset unit which includes a headband having at least one earphone thereon, a microphone mounted on the headband, a cord adapted to electrically connect the earphone and the microphone to the cellular telephone, a cord reel mechanically connected to the cord, a jack on the cord adapted to electrically connect the cord to the cellular telephone, a volume control located on the cord reel and which is electrically connected to the earphone and the microphone via the cord, and a cord lock button located on the cord reel and which is mechanically connected to the cord; and a headset unit-supporting hook mounted on the second side element of the cellular telephone-supporting unit.

The accessory embodying the present invention will thus place the cellular telephone and any headset unit associated therewith in a location that is convenient for a driver. Still further, the cellular telephone accessory embodying the present invention can be easily altered to accommodate a variety of different cellular telephones.

BRIEF DESCRIPTION OF THE DRAWING FIGURES

DETAILED DESCRIPTION OF THE PREFERRED EMBODIMENT

Figure 3:
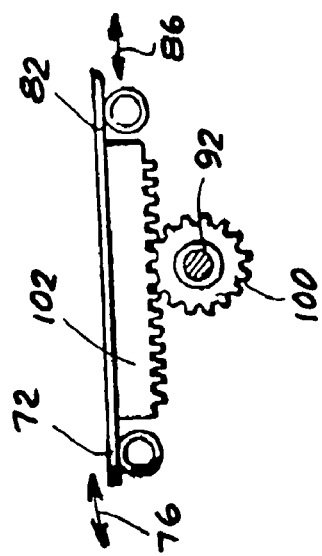
FIG. 3 shows a rack and pinion mechanism for moving the side elements to adjust the width of the cellular telephone-supporting unit embodying the present invention.
Figure 1:
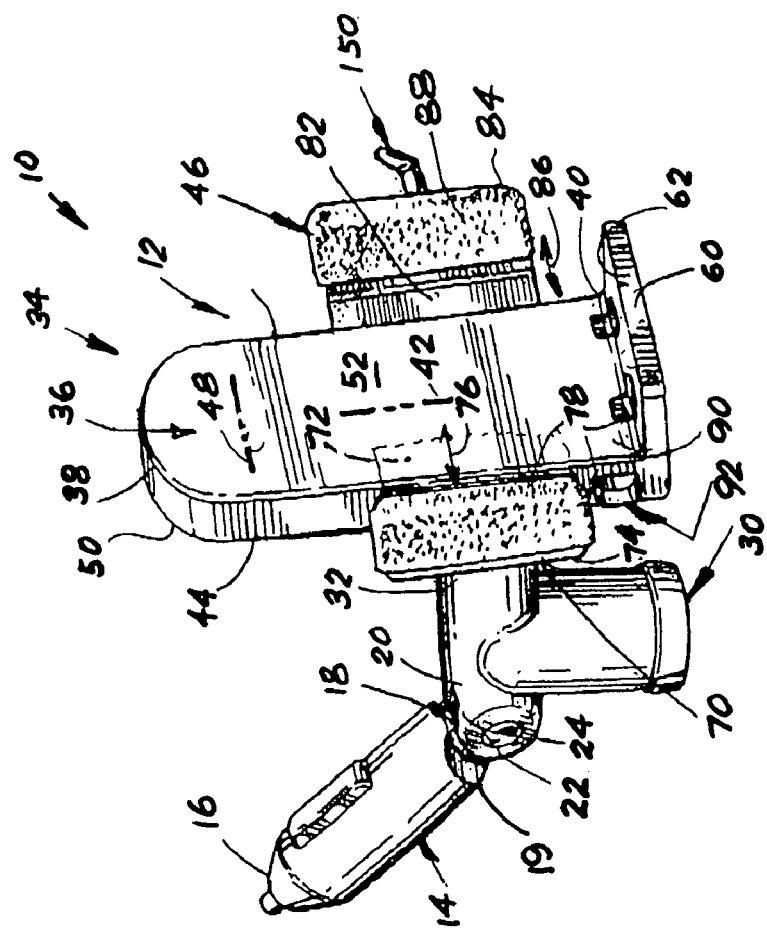
FIG. 1 is a perspective view of a base unit used in the cellular telephone-supporting unit embodying the present invention.

Other objects, features and advantages of the invention will become apparent from a consideration of the following detailed description and the accompanying drawings.

Referring to the figures, it can be understood that the present invention is embodied in an accessory for a cellular telephone that will place the cellular telephone and any headset unit associated therewith in a convenient location with respect to a driver of a motor vehicle. The accessory will maintain the headset unit with the cellular telephone when the headset is not in use so the driver need not search for the headset if he or she desires to use the headset with the cellular telephone.

As shown, the accessory 10 comprises a base unit 12 which is adapted to support a cellular telephone. Base unit 12 includes a mounting element 14 which is sized and shaped to be releasably engageable with a cigarette lighter receptacle of a motor vehicle. Mounting unit 14 has a proximal end 19 which is located outside the cigarette lighter receptacle when the mounting element 14 is engaged with the cigarette lighter receptacle. A pivot-connecting element 18 is on a proximal end 19 of the mounting element 14.

A pivot arm 20 is pivotally connected to the pivot-connecting element 18 and includes a distal end 22, a pivot-connecting element 24 on the distal end 22 of the pivot arm 20 and which is pivotally connected to the pivot-connecting element 18 so the pivot arm 20 can be moved about mounting element 14 to adjust the position of base unit 12 with respect to a dashboard of a motor vehicle. The purpose of such adjustment will be understood from the teaching of this disclosure.

A receptacle 30 accommodates a recharge cord of the cellular telephone. Pivot arm 20 further includes a proximal end 32.

A cellular telephone-supporting unit 34 is mounted on the proximal end 32 of the pivot arm 20 for movement therewith. Supporting unit 34 includes a hollow central section 36 having a first end 38, a second end 40, a longitudinal axis 42 which extends between the first end 38 of the central section 36 and the second end 40 of the central section 36. The central section 36 further includes a first side 44, a second side 46, and a transverse axis 48 which extends between the first side 44 of the central section 36 and the second side 46 of the central section 36.

Central section 36 further includes a first surface 50 to which the proximal end 32 of the pivot arm 20 is fixed and a second surface 52 against which the cellular telephone will rest when the cellular telephone is supported on the cellular telephone-supporting unit 34.

A ledge element 60 is fixed to the second end 40 of the of the central section 36 and extends away from the second surface 52 of the cellular telephone-supporting element 34. The cellular telephone will rest on top surface 62 of ledge element 60 and be supported thereby.

A first side element 70 is movably mounted on the first side 44 of the central section 36 and includes an arm 72 which extends through the first side 44 of the central section 36 and into the central section 36 and has a distal end 74 located outside the central section 36. The arm 72 of the first side element 70 is movably mounted on the central section 36 so the distal end 74 of the arm 72 of the first side element 70 is movable toward and away from the first side 44 of the central section 36. The movement of the first side element 70 is indicated by double-headed arrow 76.

A pad 78 is mounted on the arm 72 of the first side element 70.

A second side element 80 is movably mounted on the second side 46 of the central section 36 and includes an arm 82 which extends through the second side 46 of the central section 36 into the interior of the central section 36. Arm 82 has a distal end 84 located outside the central section 36. The arm 82 of the second side element 80 is movably mounted on the central section 36 so the distal end 84 of the arm 82 of the second side element 80 is movable toward and away from the second side 46 of the central section 36 as indicated by double-headed arrow 86.

Movement of the arms 72, 82 of the side elements 70, 80 permits the accessory 10 embodying the present invention to accommodate cellular telephones of various sizes and shapes.

A pad 90 is mounted on the arm 82 of the second side element 80.

A side element-moving mechanism 90 is located on the central section 36 and is connected to the arms 72, 82 of the first and second side elements 70, 80 to move those elements in directions 76 and 86. The side element-moving mechanism 90 includes a knob 92 on the first side 44 of the central section 36.

As indicated in FIG. 3, the knob 92 is connected to a gear 100 which meshes with a rack 102 on which the arms 72, 82 of the side elements 70, 80 are mounted. Rotation of the knob 92 in the clockwise or counterclockwise directions will correspondingly rotate gear 100 and move the arms 72, 82 of the side elements 70, 80 in directions 76 and 86 to vary the width dimension of the base unit 12.

Figure 2:
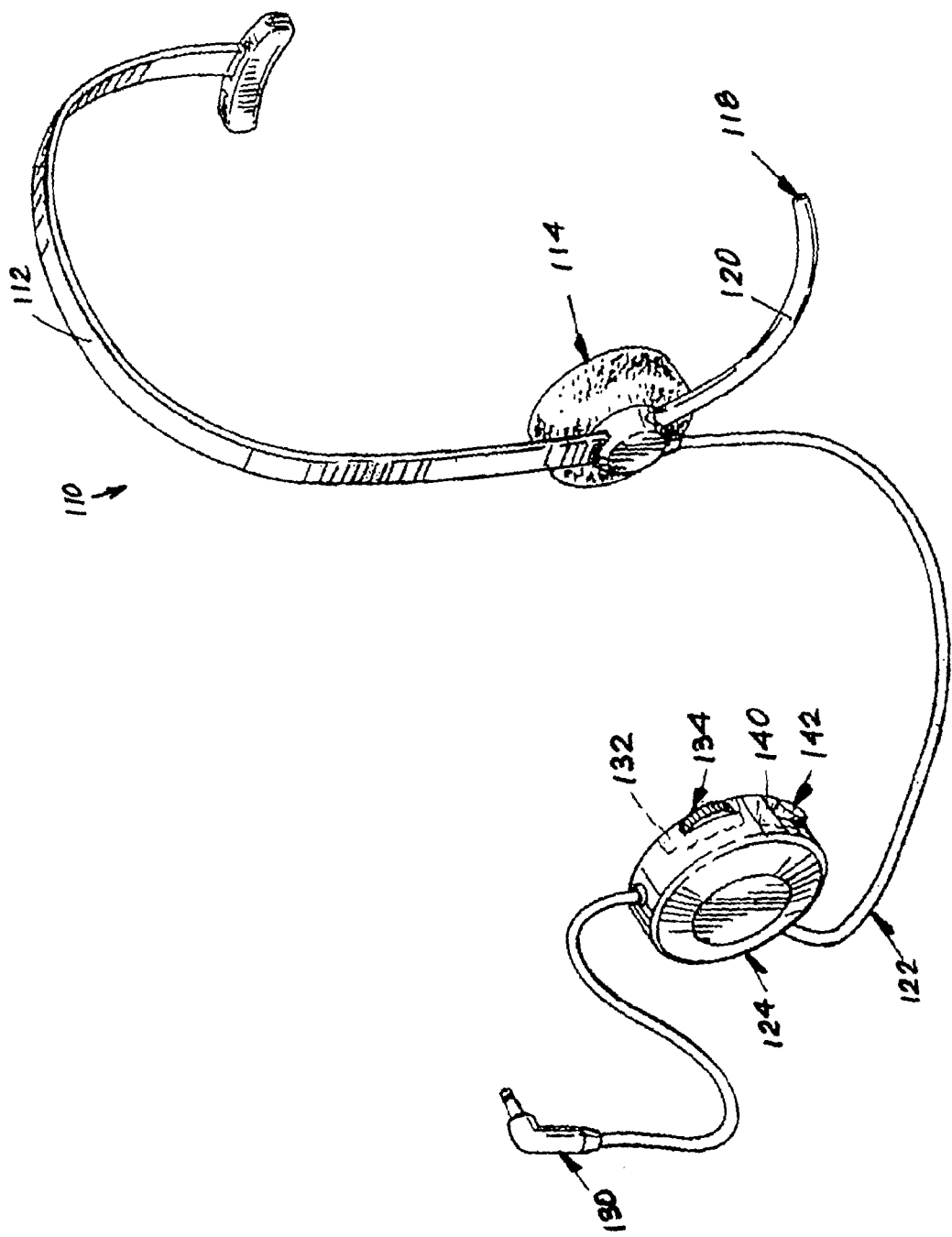
FIG. 2 shows a headset that is used with a cellular telephone and which can be supported on the base unit shown in FIG. 1.

As shown in FIG. 2, a headset unit 110 includes a headband 112 having at least one earphone 114 thereon. A microphone 118 is mounted on the headband. A microphone boom 120 can be used to movably mount the microphone 118 on the headband 112. A cord 122 electrically connects the earphone 114 and the microphone 118 to the cellular telephone. A cord reel 124 is mechanically connected to the cord 122 and rolls the cord 122 into the reel 124 to keep the cord 122 from tangling. Those skilled in the art will understand the form and type of reel that can be used to achieve this result. Therefore, the details of the reel will not be presented in detail.

A jack 130 is connected to the cord 122 and is adapted to electrically connect the cord 122 to the cellular telephone via a jack on the telephone. A volume control system 132 has a knob 134 mounted on the cord reel 124 and is electrically connected to the earphone 114 and the microphone 118 via the cord 122. Those skilled in the art will understand the circuitry and elements required to control the volume of the earphone 114 and/or the microphone 118 and thus such circuitry and elements will not be discussed in detail. A cord lock system 140 has a button 142 on the cord reel 124. The button 142 is mechanically connected to the cord 122 by means that will be understood by those skilled in the art.

An L-shaped headset unit support hook 150 is fixedly mounted on the distal end 84 of the arm 82 of the second side element 80. The headset 110 is supported on hook 150 when the headset 110 is not in use and thus the headset 110 will be stored close to the cellular telephone. A user need not search for the headset 110 when he or she wishes to use the headset 110 in combination with the cellular telephone.

It is understood that while certain forms of the present invention have been illustrated and described herein, it is not to be limited to the specific forms or arrangements of parts described and shown.

What is claimed and desired to be covered by Letters Patent is:

1. An accessory for a cellular telephone comprising:
    a) a base unit which is adapted to support a cellular telephone and which includes
        (1) a mounting element which is sized and shaped to be releasably engageable with a cigarette lighter receptacle of a motor vehicle, the mounting unit having a proximal end which is located outside the cigarette lighter receptacle when the mounting element is engaged with the cigarette lighter receptacle,
        (2) a pivot-connecting element on the distal end of the mounting element, (3) a pivot arm pivotally connected to the pivot-connecting element and which includes
(A) a proximal end,
(B) a pivot-connecting element on the proximal end of the pivot arm and which is pivotally connected to the pivot-connecting element,
(C) a receptacle for accommodating a recharge cord of the cellular telephone, and
(D) a distal end,
(4) a cellular telephone-supporting unit mounted on the distal end of the pivot arm for movement therewith and including
(A) a hollow central section having a first end, a second end, a longitudinal axis extending between the first end of the central section and the second end of the central section, a first side, a second side and a transverse axis extending between the first side of the central section and the second side of the central section,
(B) a first surface to which the distal end of the pivot arm is fixed,
(C) a second surface against which the cellular telephone will rest when the cellular telephone is supported on the cellular telephone-supporting unit,
(D) a ledge element fixed to the second end of the of the central section and which extends away from the second surface of the cellular telephone-supporting element,
(E) a first side element movably mounted on the first side of the central section and including
(i) an arm which extends through the first side of the central section and has a distal end located outside the central section, the arm of the first side element being movably mounted on the central section so the distal end of the arm of the first side element is movable toward and away from the first side of the central section, and
(ii) a pad on the arm of the first side element,
(F) a second side element movably mounted on the second side of the central section and including
(i) an arm which extends through the second side of the central section and has a distal end located outside the central section, the arm of the second side element being movably mounted on the central section so the distal end of the arm of the second side element is movable toward and away from the second side of the central section, and
(ii) a pad on the arm of the second side element;
b) a side element-moving mechanism on the central section and which is connected to the arms of the first and second side elements, the side element-moving mechanism including a knob on the first side of the central section;
c) a headset unit which includes
(1) a headband having at least one earphone thereon,
(2) a microphone mounted on the headband,
(3) a cord for electrically connecting the earphone and the microphone to the cellular telephone,
(4) a cord reel mechanically connected to the cord,
(5) a jack on the cord adapted to electrically connect the cord to the cellular telephone,
(6) a volume control system having a knob mounted on the cord reel and which is electrically connected to the earphone and the microphone via the cord, and
(7) a cord lock system having a button on the cord reel, the button being mechanically connected to the cord; and
d) an L-shaped headset unit support hook fixedly mounted on the distal end of the arm of the second side element.

2. The accessory as described in claim 1 further including a rack and pinion mechanism connecting the knob of the side element-moving mechanism to the arms of the first and second side elements.

3. The accessory as described in claim 2 wherein said headset unit further includes a boom movably connecting the microphone to the headband.

4. An accessory for a cellular telephone comprising:
a) a base unit which is adapted to be mounted in a cigarette lighter receptacle of a motor vehicle;
b) an arm pivotally connected to said base unit;
c) a cellular telephone-supporting unit fixedly attached to said arm and which includes
(1) a ledge,
(2) a first side element movably mounted on said cellular telephone supporting unit,
(3) a second side element movably mounted on said cellular telephone supporting unit,
(4) a headset supporting hook on the second side element, and
(5) a side element-moving mechanism in said cellular telephone supporting unit, the side element-moving mechanism including a width adjustment knob on the cellular telephone supporting unit, the width adjustment knob being connected to the first and second side elements; and
d) a headset unit which includes
(1) a headband having at least one earphone thereon,
(2) a microphone mounted on the headband,
(3) a cord adapted to electrically connect the earphone and the microphone to the cellular telephone,
(4) a cord reel mechanically connected to the cord,
(5) a jack on the cord adapted to electrically connect the cord to the cellular telephone,
(6) a volume control located on the cord reel and which is electrically connected to the earphone and the microphone via the cord, and
(7) a cord lock button located on the cord reel and which is mechanically connected to the cord; and
f) a headset unit-supporting hook mounted on the second side element of the cellular telephone-supporting unit.

* * * * *